(12) United States Patent
Zhang et al.

(10) Patent No.: US 12,421,419 B2
(45) Date of Patent: Sep. 23, 2025

(54) PREPARATION METHOD FOR ULTRAVIOLET-RESPONSIVE COUMARIN CONTROLLED-RELEASE AND SELF-REPAIRING ANTI-FOULING PAINT

(71) Applicant: QUZHOU RESEARCH INSTITUTE OF ZHEJIANG UNIVERSITY, Quzhou (CN)

(72) Inventors: Qinghua Zhang, Quzhou (CN); Zheming Tong, Quzhou (CN); Xiaoli Zhan, Quzhou (CN)

(73) Assignee: QUZHOU RESEARCH INSTITUTE OF ZHEJIANG UNIVERSITY, Quzhou (CN)

( * ) Notice: Subject to any disclaimer, the term of this patent is extended or adjusted under 35 U.S.C. 154(b) by 502 days.

(21) Appl. No.: 17/927,756

(22) PCT Filed: Nov. 9, 2021

(86) PCT No.: PCT/CN2021/129498
§ 371 (c)(1),
(2) Date: Nov. 25, 2022

(87) PCT Pub. No.: WO2022/160853
PCT Pub. Date: Aug. 4, 2022

(65) Prior Publication Data
US 2023/0212419 A1    Jul. 6, 2023

(30) Foreign Application Priority Data
Jan. 29, 2021   (CN) .......................... 202110123001.5

(51) Int. Cl.
C09D 175/04     (2006.01)
C08G 18/10      (2006.01)
(Continued)

(52) U.S. Cl.
CPC .......... C09D 175/04 (2013.01); C08G 18/10 (2013.01); C08G 18/242 (2013.01); C08G 18/61 (2013.01);
(Continued)

(58) Field of Classification Search
CPC ...... C09D 175/04; C09D 5/1625; C09D 7/20; C09D 7/63; C09D 5/1675; C09D 175/14;
(Continued)

(56) References Cited

U.S. PATENT DOCUMENTS

2015/0004112 A1\* 1/2015 Ritter ...................... A61Q 5/00
424/78.02

FOREIGN PATENT DOCUMENTS

| CN | 102153856 A | 8/2011 |
| CN | 109852225 A | 6/2019 |

(Continued)

OTHER PUBLICATIONS

CN 11-1393983, machine translation, retrieved May 24, 2025.\*

*Primary Examiner* — Michael B Nelson
(74) *Attorney, Agent, or Firm* — Bayramoglu Law Offices LLC

(57) ABSTRACT

A preparation method for an ultraviolet-responsive coumarin controlled-release and self-repairing anti-fouling paint includes: reacting double-end-group reactive polydimethylsiloxane, polyisocyanate, and an organic diluting solvent; adding a dihydroxycoumarin compound, a crosslinking agent and an organotin catalyst; adding a simple coumarin compound, and irradiating the mixture with 365 nm ultraviolet light to obtain the anti-fouling paint. An anti-fouling coat formed by the paint of the present invention has the advantages of controllable release of a coumarin green anti-fouling agent in response to external ultraviolet stimulation and self-repairing, and the problems that the (Continued)

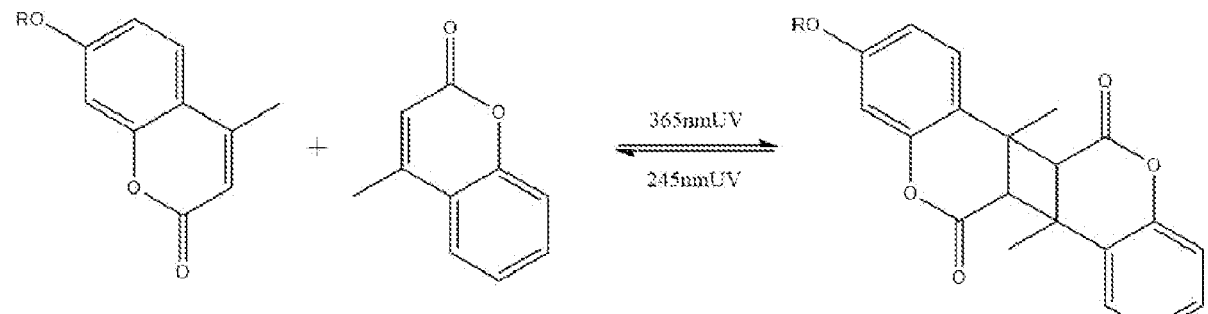

R: main chain of a polyurethane polymer release of the conventional anti-fouling agents in the anti-fouling coat is difficult to control, and that the low-surface-energy anti-fouling coat is difficult to repair after being damaged are solved. The anti-fouling application requirements of various shallow sea light-transmitting constructions can be met, the service life is prolonged, and the application performance in a complex real sea environment is enhanced.

10 Claims, 1 Drawing Sheet

(51) Int. Cl.
  C08G 18/24     (2006.01)
  C08G 18/61     (2006.01)
  C08G 18/72     (2006.01)
  C08K 5/1545    (2006.01)
  C09D 5/16      (2006.01)
  C09D 7/20      (2018.01)
  C09D 7/63      (2018.01)

(52) U.S. Cl.
  CPC ............ *C08G 18/72* (2013.01); *C08K 5/1545* (2013.01); *C09D 5/1625* (2013.01); *C09D 7/20* (2018.01); *C09D 7/63* (2018.01)

(58) Field of Classification Search
  CPC .... C09D 5/1662; C08G 18/10; C08G 18/242; C08G 18/61; C08G 18/72; C08G 18/003; C08G 18/246; C08G 18/6765; C08G 18/73; C08G 18/755; C08G 18/7657; C08G 18/7671; C08K 5/1545
  See application file for complete search history.

(56)  References Cited

FOREIGN PATENT DOCUMENTS

| | | |
|---|---|---|
| CN | 110669188 A | 1/2020 |
| CN | 111187565 A | 5/2020 |
| CN | 111393983 A | 7/2020 |
| CN | 111471154 A | 7/2020 |
| CN | 113150594 A | 7/2021 |

* cited by examiner

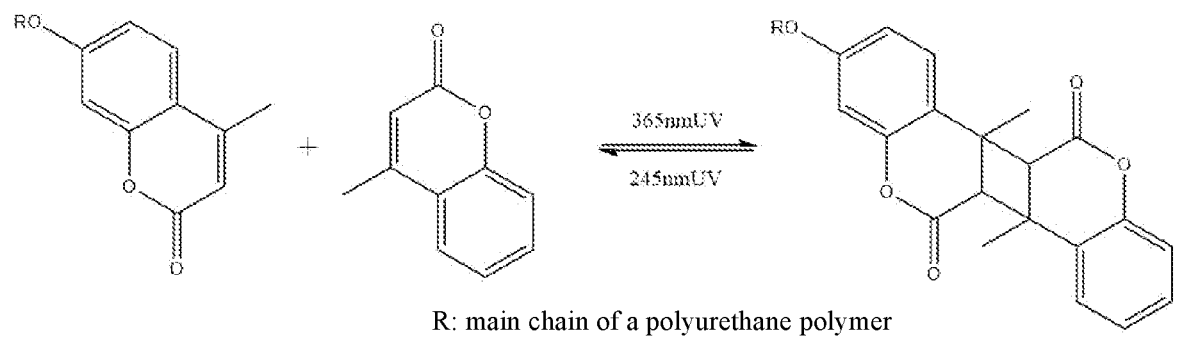
R: main chain of a polyurethane polymer

PREPARATION METHOD FOR ULTRAVIOLET-RESPONSIVE COUMARIN CONTROLLED-RELEASE AND SELF-REPAIRING ANTI-FOULING PAINT

CROSS REFERENCE TO THE RELATED APPLICATIONS

This application is the national phase entry of International Application No. PCT/CN2021/129498, filed on Nov. 9, 2021, which is based upon and claims priority to Chinese Patent Application No. 202110123001.5, filed on Jan. 29, 2021, the entire contents of which are incorporated herein by reference.

TECHNICAL FIELD

The present invention relates to a marine anti-fouling paint technology, and in particular to a preparation method for an ultraviolet-responsive coumarin controlled-release and self-repairing anti-fouling paint.

BACKGROUND

China has a land coastline of more than 18,000 kilometers, and the marine environment from north to south is complex and changeable. When a ship sails in the marine environment, the hull part is easily fouled by marine organisms due to long-term immersion in seawater. According to statistics, 4000-5000 marine fouling organisms have been discovered in the world, and as many as 650 marine fouling organisms are recorded along the coast of China. The marine fouling organisms have many various types and a wide distribution range, so that marine biofouling is likely to occur on the surfaces of artificial facilities such as ships, offshore drilling wells, exploration equipments, wharfs and aquaculture cages immersed in seawater, which has a great impact on human production and life, leading to huge economic losses.

The means for solving the marine biofouling problem include mechanical cleaning, underwater cleaning, the coating of a marine anti-fouling paint and the like, among which the simplest and most effective method is the coating of the marine anti-fouling paint.

From the development history of the marine anti-fouling paint, the originally adopted method is to kill marine organisms by releasing bactericides, wherein tributyltin self-polishing paint has the best effect. However, since organotin anti-fouling agents can be stably accumulated in water, and the marine organisms will cause deformity if they intake the agents and may enter the food chain, the International Maritime Organization has prohibited the use of organotin anti-fouling paints worldwide since January 2008. With the increasing attention of people to the marine environment, the use of a low-toxicity cuprous anti-fouling paint as an organotin substitute is partially prohibited due to the harm to the marine environment. At present, there is a need for novel nontoxic and environment-friendly marine anti-fouling paints in the market, and a low-surface-energy anti-fouling paint is an important paint in the novel marine anti-fouling paints.

A low-surface-energy marine anti-fouling paint mainly refers to an organosilicon and organofluorine anti-fouling paint. It is difficult for marine organisms to adhere to the surface of the coat utilizing the low surface energy, even if the marine organisms adhere to the coat, this adhesion is not firm and the marine organisms will fall off easily under the action of water flow or other external forces, however, such a paint relies on the washing of external water flow and has a limited static anti-fouling effect, so that a method for physically compounding an anti-fouling agent in the anti-fouling paint is usually adopted. However, the controlled release of the anti-fouling agent is a relatively difficult problem to solve. Meanwhile, due to the characteristics of low modulus and low surface energy of the low-surface-energy anti-fouling coat, the anti-fouling coat is difficult to repair after being damaged.

SUMMARY

The present invention aims to solve the technical problems that the release of the anti-fouling agent in the conventional low-surface-energy anti-fouling paint is difficult to control and the anti-fouling agent is difficult to repair after being damaged by the outside world, and provides a preparation method for an ultraviolet-responsive coumarin controlled-release and self-repairing anti-fouling paint for overcoming the defects of the prior art.

In order to solve the technical problems, the present invention adopts the following solution: a preparation method for an ultraviolet-responsive coumarin controlled-release and self-repairing anti-fouling paint, comprising the following steps:

(1) taking 10-50 parts by weight of double-end-group reactive polydimethylsiloxane, 1-10 parts by weight of polyisocyanate and 10-100 parts by weight of an organic diluting solvent, uniformly mixing the mixture, and then heating the mixture for 4 h under $N_2$ atmosphere at 60-80° C. to obtain an isocyanate-terminated prepolymer;

(2) then adding 1-20 parts by weight of a dihydroxycoumarin compound, 0.1-0.2 parts by weight of a polyol or polyamine cross-linking agent and 0.1-0.2 parts by weight of an organotin catalyst, uniformly mixing the mixture, and afterwards heating the mixture for 2 h under $N_2$ atmosphere at the same temperature as that in the step (1) to form a polymer solution of polyurethane; and (3) then adding 1-20 parts by weight of a simple coumarin compound, uniformly mixing the mixture, and then irradiating the mixture for 4 h with 365 nm ultraviolet light to obtain the anti-fouling paint.

In the present invention, the double-end-group reactive polydimethylsiloxane has a weight-average molecular weight of 500-5000; and the double-end groups in the molecular formula thereof are: one or more of hydroxypropyl, aminopropyl and epoxy.

In the present invention, the polyisocyanate is diisocyanate or triisocyanate, in particular, one or more of diphenylmethane diisocyanate, hexamethylene diisocyanate, isophorone diisocyanate and triphenylmethane triisocyanate.

In the present invention, the organic diluting solvent is: one or more of tetrahydrofuran, xylene, N,N-dimethylformamide and butyl acetate.

In the present invention, the dihydroxycoumarin compound is: a composition of one or more of 4,7-dihydroxycoumarin, 5,7-dihydroxycoumarin, 6,7-dihydroxycoumarin, 5,7-dihydroxy-4-methylcoumarin, 7,8-dihydroxy-4-methyl coumarin, 7-dihydroxypropyl-4-methylcoumarin and 7-dihydroxybutyl-4-methylcoumarin.

In the present invention, the polyol or polyamine cross-linking agent is: one or more of glycerol, butanediol, triethylamine and hexanediamine.

In the present invention, the organotin catalyst is: one or more of dibutyltin dilaurate, dibutyltin acetoacetate, dibutyltin diacetate and dibutyltin dipentanate.

In the present invention, the simple coumarin compound is a coumarin or derivative compound having a benzopyranone structure; specifically, one or more of coumarin, hydroxymethyl coumarin, methylcoumarin, methoxycoumarin, ethoxycoumarin, aminocoumarin, carboxycoumarin and acetylcoumarin.

The present invention further provides a use method for the ultraviolet-responsive coumarin controlled-release and self-repairing anti-fouling paint prepared by the aforementioned method, which comprises the following steps:

(1) cleaning a surface to be sprayed;

(2) uniformly coating the anti-fouling paint on the surface to be sprayed in an air spraying manner, wherein a wet film has a coating thickness of 250-350 μm; and (3) drying the film for 48 h at room temperature with ventilation to obtain a dry coating film.

DESCRIPTION OF THE INVENTION PRINCIPLE

Coumarin and derivatives thereof have a response effect on ultraviolet light, and double bonds on a pyran ring of the coumarin can form a butane ring under the action of 365 nm ultraviolet light, so that 2 coumarin monomers form a dimeric compound by a covalent bond; such a covalent bond is broken under the action of 254 nm ultraviolet light, and 2 independent coumarin monomers are formed again, which is called ultraviolet-responsive photodimerization and photodepolymerization of coumarin.

Based on the photodimerization and photodepolymerization of coumarin under different ultraviolet lights, a smart marine anti-fouling paint with controllable coumarin release performance in response to ultraviolet lights is prepared. Free coumarin is bound in the coat in the form of reversible covalent bonds by photodimerization under 365 nm ultraviolet light and the aforementioned reversible covalent bonds are broken under the action of 254 nm UV, and then the coumarin is released from the coat to prevent marine fouling organisms from adhering to and growing on the surface.

According to the present invention, by utilizing the properties of photodimerization of coumarin compounds under the irradiation of ultraviolet lights with a wavelength of 365 nm and photodepolymerization under 254 nm ultraviolet lights, as shown in FIGURE, free coumarin compounds are chemically loaded to a polymer chain through photodimerization and then are released through photodepolymerization, so that the coat has the ultraviolet-responsive coumarin controlled-release performance. In addition, the coat has ultraviolet self-repairing performance through the photodimerization effect of 365 nm ultraviolet light on the coumarin compounds on a polymer chain.

Compared with the prior art, the present invention has the following beneficial effects.

1. The anti-fouling coat prepared by the present invention has the advantages of controllable release of a coumarin green anti-fouling agent in response to external ultraviolet stimulation and self-repairing, and solves the problems that the release of the conventional anti-fouling agents in the anti-fouling coat is difficult to control, and that the low-surface-energy anti-fouling coating is difficult to repair after being damaged.

2. The present invention can meet the anti-fouling application requirements of the light-transmitting parts of shallow sea of various ships, marine engineering equipments and structural facilities, marine pasture cultivation netting gears and the like. The anti-fouling coat prepared by the present invention has ultraviolet-responsive coumarin controlled-release and self-repairing performance, which can prolong the service life and enhance the application performance in a complex real sea environment.

BRIEF DESCRIPTION OF THE DRAWINGS

FIG. 1 is a mechanism for an ultraviolet-responsive coumarin controlled-release and self-repairing low-surface-energy anti-fouling coat;

DETAILED DESCRIPTION OF THE EMBODIMENTS

The present invention will be further described in detail with reference to specific examples and comparative examples. The examples are intended to give those skilled in the art a more complete understanding of the present invention, but are not intended to limit the present invention in any way.

Example 1

The preparation method and use method for the ultraviolet-responsive coumarin controlled-release and self-repairing anti-fouling paint related to the example are as follows:

(1) taking 10 g of dihydroxypropyl-terminated polydimethylsiloxane (having a molecular weight of 500), 1 g of hexamethylene diisocyanate (HDI) and 10 g of tetrahydrofuran, uniformly mixing the mixture, and then heating the mixture for 4 h under $N_2$ atmosphere at 60° C. to form an isocyanate-terminated prepolymer;

(2) adding 1 g of 4,7-dihydroxycoumarin, 0.1 g of triethylamine and 0.1 g of dibutyltin diacetate, uniformly mixing the mixture, and then heating the mixture for 2 h under $N_2$ atmosphere at 60° C. to form a polymer solution of polyurethane;

(3) adding 1 g of coumarin and stirring uniformly, and irradiating the mixture for 4 h with 365 nm ultraviolet light to obtain the anti-fouling paint.

(4) uniformly coating the anti-fouling paint on a surface to be sprayed of a specimen in an air spraying manner with a coating thickness of about 250 μm (wet film); and drying the film for 48 h at room temperature with ventilation to obtain a dry coating film.

Example 2

The preparation method and use method for the ultraviolet-responsive coumarin controlled-release and self-repairing anti-fouling paint related to the example are as follows:

(1) taking 20 g of diepoxy-terminated polydimethylsiloxane (having a molecular weight of 1000), 3 g of isophorone diisocyanate (IPDI) and 60 g of xylene, uniformly mixing the mixture, and then heating the mixture for 4 h under $N_2$ atmosphere at 75° C. to form an isocyanate-terminated prepolymer;

(2) adding 10 g of 5,7-dihydroxy-4-methylcoumarin, 0.15 g of butanediol and 0.15 g of dibutyltin dilaurate, uniformly mixing the mixture, and then heating the mixture for 2 h under $N_2$ atmosphere at 75° C. to form a polymer solution of polyurethane;

(3) adding 10 g of hydroxymethyl coumarin and stirring uniformly, and irradiating the mixture for 4 h with 365 nm ultraviolet light to obtain the anti-fouling paint.

(4) uniformly coating the anti-fouling paint on a surface to be sprayed of a specimen in an air spraying manner with a coating thickness of about 300 μm (wet film); and drying the film for 48 h at room temperature with ventilation to obtain a dry coating film.

Example 3

The preparation method and use method for the ultraviolet-responsive coumarin controlled-release and self-repairing anti-fouling paint related to the example are as follows:

(1) taking 30 g of dihydroxypropyl-terminated polydimethylsiloxane (having a molecular weight of 3000), 5 g of diphenylmethane diisocyanate (MDI) and 100 g of butyl acetate, uniformly mixing the mixture, and then heating the mixture for 4 h under $N_2$ atmosphere at 80° C. to form an isocyanate-terminated prepolymer;

(2) adding 15 g of 7-dihydroxypropyl-4-methylcoumarin, 0.18 g of glycerol and 0.18 g of dibutyltin acetoacetate, uniformly mixing the mixture, and then heating the mixture for 2 h under $N_2$ atmosphere at 80° C. to form a polymer solution of polyurethane;

(3) adding 15 g of methylcoumarin and stirring uniformly, and irradiating the mixture for 4 h with 365 nm ultraviolet light to obtain the anti-fouling paint.

(4) uniformly coating the anti-fouling paint on a surface to be sprayed of a specimen in an air spraying manner with a coating thickness of about 350 μm (wet film); and drying the film for 48 h at room temperature with ventilation to obtain a dry coating film.

Example 4

The preparation method and use method for the ultraviolet-responsive coumarin controlled-release and self-repairing anti-fouling paint related to the example are as follows:

(1) taking 50 g of bisaminopropyl-terminated polydimethylsiloxane (having a molecular weight of 5000), 10 g of triphenylmethane triisocyanate and 100 g of N,N-dimethylformamide, uniformly mixing the mixture, and then heating the mixture for 4 h under $N_2$ atmosphere at 60° C. to form an isocyanate-terminated prepolymer;

(2) adding 20 g of 7-dihydroxybutyl-4-methylcoumarin, 0.2 g of hexamethylene diamine and 0.2 g of dibutyltin dipentanate, uniformly mixing the mixture, and then heating the mixture for 2 h under $N_2$ atmosphere at 60° C. to form a polymer solution of polyurethane;

(3) adding 20 g of methoxycoumarin and stirring uniformly, and irradiating the mixture for 4 h with 365 nm ultraviolet light to obtain the anti-fouling paint.

(4) uniformly coating the anti-fouling paint on a surface to be sprayed of a specimen in an air spraying manner with a coating thickness of about 350 μm (wet film); and drying the film for 48 h at room temperature with ventilation to obtain a dry coating film.

Performance Evaluation Results:

(1) Anti-Fouling Performance in Real Sea

The test method was performed referring to the national standard GB/T 5370-2007 "Method for testing anti-fouling panels in shallow submergence". The used base material was a low-carbon steel plate with a thickness of 3 mm and a size of 350 mm×250 mm, the shallow submergence period was 3 months (August to November), and the submergence depth was 0.5 m.

Level I: the adhesion of extremely thin mucus was confirmed, but the adhesion of animal species was not confirmed Level II: the adhesion of thin mucus was confirmed, but the adhesion of animal species was not confirmed Level III: the adhesion of thick mucus was confirmed, but the adhesion of animal species was not confirmed Level IV: the fouling of animal species was confirmed Level V: the adhesion of animal species was confirmed on the entire coating film.

The results of the anti-fouling performance in the real sea are shown in Table 1.

(2) Coumarin Release Performance

The coumarin release rate of the coat in water under 254 nm ultraviolet light and the dark environment was tested, the distance between an ultraviolet lamp (HB-UVC-250W from Hubang Electronic Technology Co., Ltd.) and the coat was 1 m, the submergence depth was 1 m, and the concentration of the released coumarin was detected by an ultraviolet spectrophotometer.

The coumarin release rate of the coat in water under the sunlight environment was tested, the submergence depth was 1 m, and the concentration of the released coumarin was detected by an ultraviolet spectrophotometer.

The test results of the coumarin release performance are shown in Table 1.

(3) Characterization of Ultraviolet Self-Repairing Performance

The specimen strips of the prepared coat (3×3×0.1 cm) were completely cut off and then joined, and irradiated with 365 nm ultraviolet light in water for 4 h, and the cut marks were observed with an optical microscope.

Level I: the specimen strips were joined, and the cut marks were difficult to observe with the naked eye and with a microscope Level II: the specimen strips were joined, and the cut marks were difficult to observe with the naked eye and can be observed with a microscope Level III: the specimen strips were joined, and the cut marks can be observed by the naked eyes Level IV: the specimen strips were not joined The test results of the ultraviolet self-repairing performance characterization are shown in Table 1.

TABLE 1

Test results of the ultraviolet-responsive coumarin controlled-release and self-repairing anti-fouling coat

| | | Example 1 | Example 2 | Example 3 | Example 4 |
|---|---|---|---|---|---|
| Test results | Anti-fouling test in real sea | Level II | Level I | Level I | Level I |
| | Release rate in ultraviolet light (mg · cm$^{-2}$ · day$^{-1}$) | 0.52 | 0.58 | 0.64 | 0.72 |
| | Release rate in dark environment (mg · cm$^{-2}$ · day$^{-1}$) | 0.02 | 0.01 | 0.03 | 0.05 |
| | Release rate in daylight (mg · cm$^{-2}$ · day$^{-1}$) | 0.43 | 0.39 | 0.41 | 0.46 |
| | Self-repair performance | Level I | Level I | Level I | Level I |

Summary of Verification Tests:

It can be seen from the test results in Table 1, the coumarin release rate of the ultraviolet-responsive coumarin controlled-release and self-repairing anti-fouling coat prepared in the examples of the present invention under the irradiation of ultraviolet light (254 nm) is significantly higher than that under the dark condition, which proves that the ultraviolet-responsive coumarin controlled-release and self-repairing anti-fouling coat has the controllable release performance in response to ultraviolet lights. Under the condition of sunlight in the real sea, because the spectrum of the sunlight also comprises 254 nm ultraviolet light part, the coumarin release performance of the coat under the sunlight is also significantly superior to that under the dark condition, which further proves the controllable release of the coumarin of the coat under the ultraviolet light and sunlight. The results of the real sea submergence anti-fouling experiments show that the anti-fouling coat has a good real sea anti-fouling effect. Ultraviolet self-repairing experiments show that the coat has good self-repairing performance under the ultraviolet light (365 nm). The results of the above experiments prove that the anti-fouling coat prepared by the present invention can meet the requirements of anti-fouling applications in the light-transmitting parts of shallow sea of various ships, marine engineering equipment and structural facilities, marine pasture cultivation netting gears and the like.

Although the specific embodiments of the present invention have been described in detail and illustrated in the examples section, various modifications and alternatives can also be made to the present invention. It should be understood that the present invention is not intended to be limited to the particular forms disclosed. The present invention is to cover all modifications, equivalents, and alternatives which fall within the spirit and scope of the present invention as defined by the appended claims.

What is claimed is:

1. A preparation method for an ultraviolet-responsive coumarin controlled-release and self-repairing anti-fouling paint, comprising the following steps:
    (1) taking 10 parts-50 parts by weight of a double-end-group reactive polydimethylsiloxane, 1_part-10 parts by weight of polyisocyanate, and 10 parts-100 parts by weight of an organic diluting solvent to obtain a first mixture, mixing the first mixture, and then heating the first mixture for 4 h under $N_2$ atmosphere at 60° C.-80° C. to obtain an isocyanate-terminated prepolymer;
    (2) then adding to the first mixture 1 part-20 parts by weight of a dihydroxycoumarin compound, 0.1_parts-0.2 parts by weight of a polyol or polyamine cross-linking agent, and 0.1_parts-0.2 parts by weight of an organotin catalyst to obtain a second mixture, mixing the second mixture, and afterwards heating the second mixture for 2 h under the $N_2$ atmosphere at 60° C.-80° C. to form a polymer solution of polyurethane; and
    (3) then adding to the second mixture 1 part-20 parts by weight of a coumarin compound to obtain a third mixture, mixing the third mixture, and then irradiating the third mixture for 4 h with a 365 nm ultraviolet light to obtain the ultraviolet-responsive coumarin controlled-release and self-repairing anti-fouling paint.

2. The preparation method according to claim 1, wherein the double-end-group reactive polydimethylsiloxane has a weight-average molecular weight of 500-5000; and double-end groups in a molecular formula of the double-end-group reactive polydimethylsiloxane are one or more of a hydroxypropyl group, an aminopropyl group, and an epoxy group.

3. The preparation method according to claim 1, wherein the polyisocyanate is diisocyanate or triisocyanate.

4. The preparation method according to claim 1, wherein the organic diluting solvent is one or more of tetrahydrofuran, xylene, N,N-dimethylformamide, and butyl acetate.

5. The preparation method according to claim 1, wherein the dihydroxycoumarin compound is one or more of 4,7-dihydroxycoumarin, 5,7-dihydroxycoumarin, 6,7-dihydroxycoumarin, 5,7-dihydroxy-4-methylcoumarin, 7,8-dihydroxy-4-methylcoumarin, 7-dihydroxypropyl-4-methylcoumarin, and 7-dihydroxybutyl-4-methylcoumarin.

6. The preparation method according to claim 1, wherein the polyol or polyamine cross-linking agent is one or more of glycerol, butanediol, triethylamine, and hexanediamine.

7. The preparation method according to claim 1, wherein the organotin catalyst is one or more of dibutyltin dilaurate, dibutyltin acetoacetate, dibutyltin diacetate, and dibutyltin dipentanate.

8. The preparation method according to claim 3, wherein the polyisocyanate is one or more of diphenylmethane diisocyanate, hexamethylene diisocyanate, isophorone diisocyanate, and triphenylmethane triisocyanate.

9. The preparation method according to claim 1, wherein the coumarin compound is one or more of coumarin, hydroxymethyl coumarin, methylcoumarin, methoxycoumarin, ethoxycoumarin, aminocoumarin, carboxycoumarin, and acetylcoumarin.

10. A method for using the ultraviolet-responsive coumarin controlled-release and self-repairing anti-fouling paint prepared by the preparation method according to claim 1, comprising the following steps:
    (1) cleaning a surface to be sprayed;
    (2) coating the ultraviolet-responsive coumarin controlled-release and self-repairing anti-fouling paint on the surface a simple coumarin of 250 μm-350 μm; and
    (3) drying the wet film for 48 h at via air spraying to form a wet film that has a thickness to obtain a dry coating film.

* * * * *